(12) United States Patent
Luu (10) Patent No.: US 7,555,661 B2
(45) Date of Patent: Jun. 30, 2009

(54) POWER MANAGEMENT IN DIGITAL RECEIVERS THAT ADJUSTS AT LEAST ONE A OF CLOCK RATE AND A BIT WIDTH BASED ON RECEIVED SIGNAL

(75) Inventor: Howard K. Luu, Temple City, CA (US)

(73) Assignee: SiRF Technology, Inc., San Jose, CA (US)

( * ) Notice: Subject to any disclaimer, the term of this patent is extended or adjusted under 35 U.S.C. 154(b) by 329 days.

(21) Appl. No.: 11/381,305

(22) Filed: May 2, 2006

(65) Prior Publication Data

US 2007/0064839 A1 Mar. 22, 2007

Related U.S. Application Data

(60) Provisional application No. 60/677,439, filed on May 3, 2005.

(51) Int. Cl.
G06F 1/32 (2006.01)
(52) U.S. Cl. .......................... 713/320; 375/316; 455/574
(58) Field of Classification Search ................. 713/320; 375/316; 455/574
See application file for complete search history.

(56) References Cited

U.S. PATENT DOCUMENTS

| | | | |
|---|---|---|---|
| 6,134,430 A | 10/2000 | Younis et al. | |
| 6,411,892 B1 | 6/2002 | Van Diggelen | |
| 6,417,801 B1 | 7/2002 | Van Diggelen | |
| 6,429,814 B1 | 8/2002 | Van Diggelen et al. | |
| 6,453,237 B1 | 9/2002 | Fuchs et al. | |
| 6,484,097 B2 | 11/2002 | Fuchs et al. | |
| 6,487,499 B1 | 11/2002 | Fuchs et al. | |
| 6,510,387 B2 | 1/2003 | Van Diggelen | |
| 6,542,820 B2 | 4/2003 | LaMance et al. | |
| 6,560,534 B2 | 5/2003 | Abraham et al. | |
| 6,606,346 B2 | 8/2003 | Abraham et al. | |
| 6,693,953 B2 * | 2/2004 | Cox et al. | 375/141 |
| 6,704,651 B2 | 3/2004 | Van Diggelen | |
| 7,298,784 B2 * | 11/2007 | Matsusaka | 375/259 |
| 2004/0228283 A1 | 11/2004 | Naguib et al. | |
| 2005/0117630 A1 | 6/2005 | Kishi | |

OTHER PUBLICATIONS

PCT International Search Report, Mar. 20, 2008.

* cited by examiner

*Primary Examiner*—Thomas Lee
*Assistant Examiner*—Albert Wang
(74) *Attorney, Agent, or Firm*—Thomas, Kayden, Horstemeyer & Risley, LLP (57) ABSTRACT

Methods and systems consistent with the present invention provide a method for dynamically controlling power consumption in a digital demodulator circuit by varying clock rates and bit widths of demodulator components including an analog to digital converter, decimation filter, OFDM operating engine, FEC decoder, and MPE-FEC processor, according to parameters and conditions of the received signal including modulation mode, signal to noise ratio, effective bit transmission rate, bit error rate, packet error rate, adjacent channel interference, and co-channel interference.

23 Claims, 4 Drawing Sheets

Demodulator 104

POWER MANAGEMENT IN DIGITAL RECEIVERS THAT ADJUSTS AT LEAST ONE A OF CLOCK RATE AND A BIT WIDTH BASED ON RECEIVED SIGNAL

CROSS-REFERENCE TO RELATED APPLICATIONS

This application is a NONPROVISIONAL and claims the priority benefit of U.S. Provisional Application No. 60/677,439, entitled "Power Management in Digital Receivers," filed on May 3, 2005, assigned to the assignee of the present invention and incorporated herein by reference.

FIELD OF THE INVENTION

The present invention relates to the field of digital receivers. More particularly, the invention relates to the field of power management in digital receivers.

BACKGROUND

The telecommunications industry, through the European Broadcasting Union, has promulgated a set of standards for digital video broadcasting (DVB). Among the most recent of such standards is one (entitled ETSI EN 302 304, "Digital Video Broadcasting Transmission System for Handheld Terminals") related to digital video broadcasting (DVB) to a handheld device (DVB-H), which sets forth agreed upon requirements for delivering live broadcast television to mobile phones and the like. In large part, this standard relies upon earlier-developed standards within the DVB family, including ETSI EN 301 192, "Digital Video Broadcasting Specification for Data Broadcasting". Each of these documents is incorporated herein by reference.

With DVB-H, viewers are able to receive television-like services on their handheld devices. While exciting, this prospect does pose certain technical challenges for example with respect to power consumption at the handheld device. In order to prolong battery life of a handheld device, the DVB-H specification provides for "time-saving". That is, data is delivered to the handheld device in bursts at various time intervals. When not receiving a desired burst of data, the tuner of the handheld device is powered down, thereby conserving battery power. The user does not notice the period of inactivity since the data bursts are stored in memory and played out continuously.

It is anticipated that a typical user of a battery-operated television receiver that is incorporated into a device such as a cellular telephone will desire one or two hours of television function per day, in addition to any telephone talk time, before recharging the device at the end of the day. Existing integrated circuit chips for demodulating digital DVB signals according to the standards promulgated by the European Telecommunications Standards Institute (ETSI), consume too much power to allow the anticipated use time without requiring unacceptably large batteries. Consequently, various methods have been used or proposed to reduce power consumption. For example, chip designers have sought to reduce power consumption by scaling down feature dimensions, which results in reduced internal (parasitic) capacitance, and by reducing the chip's operating voltage. Other methods focus on powering down through clock gating of components or portions of a chip that are not being used.

Luca Benini et al., Monitoring System Activity for OS-Directed Dynamic Power Management, Power Electronics and Design, 1998 Proceedings, pp. 185-190, 1998 ACM 1-58113-059-7/98/0008, purports to disclose a data collection tool for collecting and analyzing data that is relevant for dynamic power management, and discusses dynamic power management methods aimed at putting system components into a low power sleep mode when they are idle. Masakatsu Nakai et al., Dynamic Voltage and Frequency Management for a Low-Power Embedded Microprocessor, IEEE Journal of Solid-State Circuits, Vol. 40, Issue 1 (January 2005), pp. 28-35, purports to disclose a dynamic voltage and frequency management technique in which the supply voltage is varied, and the clock frequency of a processor is varied according to the level of system activity detected.

SUMMARY OF THE INVENTION

Typically, when designing a digital demodulation chip a designer targets some performance criteria corresponding to certain worst case operating conditions. These worst case operating conditions will be experienced only about 10% of the time that the device is operating. Because the worst case conditions require the greatest amount of processing power, the resulting device consumes unnecessary power 90% of the time. Methods and systems consistent with the present invention take advantage of the fact that the maximum processing power in a processing chip such as a digital demodulator chip, which corresponds to the worst case operating conditions, is only needed a small percentage of the time.

Power consumption is dynamically controlled in a digital demodulator circuit by varying clock rates and bit widths of demodulator components including an analog to digital converter, decimation filter, OFDM operating engine, FEC decoder, and MPE-FEC processor, according to parameters and conditions of the received signal including modulation mode, signal to noise ratio, effective bit transmission rate, bit error rate, packet error rate, adjacent channel interference, and co-channel interference. The method is particularly well suited for use in portable digital video broadcast-terrestrial or handheld (DVB-T/H) receivers. Simulations indicate that a demodulator chip according to methods and systems consistent with the present invention meet worst case operating conditions while consuming only one fourth of the power of an equivalent device under some operating conditions.

In accordance with methods consistent with the present invention, a method is provided for managing power in a receiver that receives a signal from a transmitter. The receiver includes a demodulator comprising a plurality of components. The method comprises the steps of determining the operating mode of the transmitter; measuring a characteristic of the signal; determining a minimum operating parameter of one of the plurality of components, wherein the minimum operating parameter is based on the operating mode and the characteristic; and adjusting an operating parameter of the component to the minimum operating parameter.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION

Reference will now be made in detail to an implementation consistent with the present invention as illustrated in the accompanying drawings. Wherever possible, the same reference numbers will be used throughout the drawings and the following description to refer to the same or like parts. Although discussed with reference to these illustrations, the present invention is not limited to the implementations illustrated therein. Hence, the reader should regard these illustrations merely as examples of embodiments of the present invention, the full scope of which is measured only in terms of the claims following this description.

Figure 1:
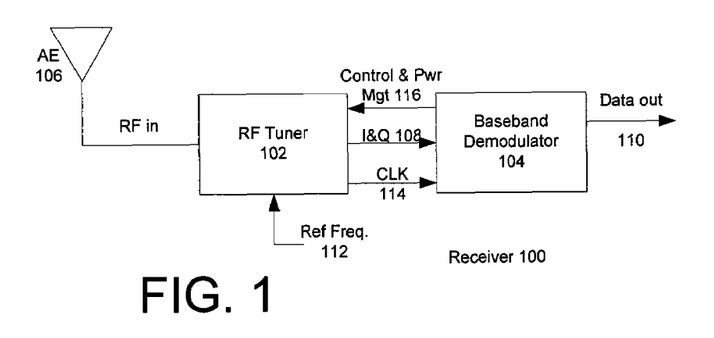
FIG. 1 is a simplified block diagram of a DVB-H receiver configured in accordance with an embodiment of the present invention.

Referring first to FIG. 1, a simplified block diagram of a DVB-H receiver 100 is shown. Receiver 100 includes a radio frequency (RF) tuner section 102 and a baseband demodulator section 104. RF signals received by antenna 106 (which may be one or more antennas) are presented at the input of RF tuner 102. The tuner downconverts these RF signals and produces I and Q outputs 108 which are provided as inputs to the demodulator 104. Demodulator 104 extracts the data signals from the downconverted I & Q inputs to produce a data out signal 110.

Typically, RF tuner 102 will include some form of onboard clocking device, for example a programmable frequency synthesizer. A reference frequency 112 may be provided as a reference source for this clocking device. In some cases the reference frequency may be provided by a voltage controlled oscillator or other source. In addition to being used by the tuner 102, the clock signal 114 is provided to the demodulator 104. As discussed further below, demodulator 104 includes power management circuitry and provides power management and control signals 116 to RF tuner 102. These power management and control signals may be used, in part, to power up or down various modules or other components to tuner 102 so as to conserve power within receiver 100.

Figure 2:
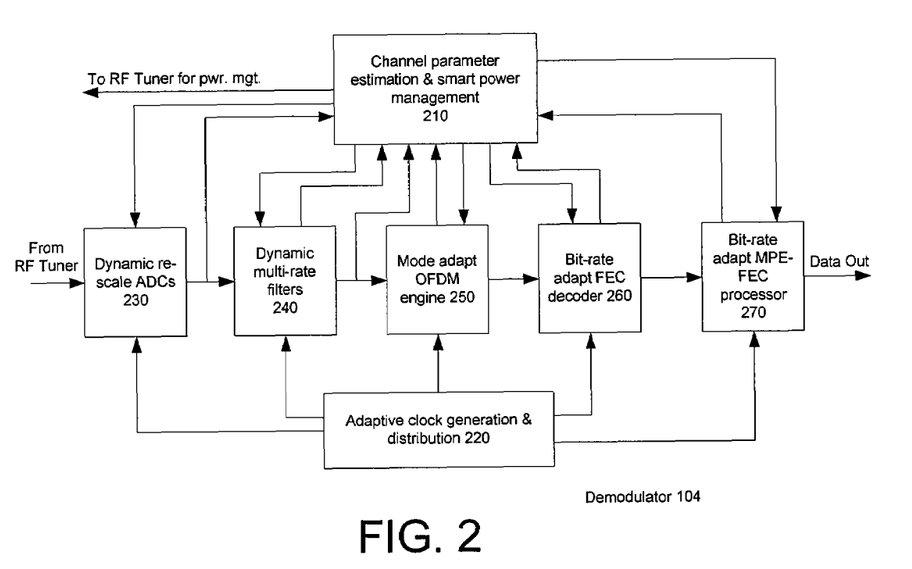
FIG. 2 depicts a block diagram of an adaptive power management implementation in a demodulator according to one aspect of the present invention.

Turning now to FIG. 2, the demodulator 104 is shown in further detail. In particular, this illustration shows a block diagram of an adaptive power management scheme as implemented in the demodulator 104 of a receiver according to one aspect of an exemplary embodiment consistent with the present invention. For example, the adaptive power management scheme may be implemented in a demodulator of a DVB-H receiver. To better appreciate the need for some of the demodulator components, it is important to recognize that the DVB-H specification allows for the use of two levels of forward error correction (FEC); one at the transport stream layer, and one at the multi-protocol encapsulation (MPE) layer. That is, the DVB-H communication protocol is designed for transporting MPEG-2 compliant data packets that include the audio/video information which makes up the television or other program and the MPEG-2 standard provides a first layer of FEC capabilities by sending redundant information with the audio/video data in order to allow the receiver to reconstruct that data if there are any errors in transmission. Multi-protocol encapsulation provides a means for combining multiple MPEG-2 packets in a single frame, in this case as IP datagrams, and the DVB-H standard adds an additional (optional) layer of FEC capability for these MPE frames.

The demodulator 104 includes a channel parameters estimation and smart power management module 210, an adaptive clock generation and distribution module 220, and a number of other components. These components include dynamic re-scale analog-to-digital converters (ADC) 230, a dynamic multi-rate filter 240, a mode adapt OFDM engine 250, a bit-rate adapting forward error correcting (FEC) decoder 260, and a bit-rate adapting multi-protocol encapsulation-forward error correction (MPE-FEC) processor 270. In a preferred embodiment, the adaptive clock generation and distribution module 220 and the power management module 210 comprise firmware.

As depicted in FIG. 2, the analog signal from the RF tuner is converted to a digital signal in the ADC 230. The dynamic multi-rate filter 240 conditions the signal from the ADC 230 to an optimum level to minimize any adjacent channel interference, and to optimize the dynamic range of the signal without clipping. The dynamic multi-rate filter 240 may run at 6×, 4×, 2× or 1×, which are the fundamental FFT assembly rates for DVB-H transmissions.

The OFDM engine 250 performs the orthogonal frequency division multiplexing modulation, which includes FFT, deinterleaving, slicing, and other processing steps. The FEC decoder 260 performs first level error correction on the data signal to correct any data bits that are received in error, while the MPE-FEC processor 270, which receives the transport stream from the FEC decoder 260, performs second level error correction using Reed-Solomon parity bits transmitted with the IP datagrams that make up the data signal to correct any errors in the IP datagrams and allow extraction of the audio/video information for application layer processing.

Methods and systems consistent with the present invention provide a smart power management scheme based on both modulation mode (static power management) and channel condition (dynamic power management) in order to minimize power consumption. According to the static power management aspect, the operating mode of the transmitter is monitored, and the operating parameters of the demodulator 104 are adjusted accordingly. The operating mode may include the scheme used to transmit the wireless signals, such as 2K/4K/8K mode, quadrature phase shift keying (QPSK), 16-quadrature amplitude modulation (16-QAM), 64-quadrature amplitude modulation (64-QAM), hierarchical modulation, in-depth VS native de-interleaving, and convolutional code rate. The operating modes and the modulation/demodulation schemes affect the bit rate of the transmitted signal, which in turn affect the minimum clock rate to sustain the bit rate because faster clock rates consume more power. Thus, the static power management aspects of the present invention take advantage of the fact that different amounts of processing power are required for the different operating modes and attendant modulation/demodulation schemes.

According to the dynamic power management aspects of the present invention, dynamic parameters such as signal to noise ratio, error rates for the channel (including both the random and burst error rates), and interference are monitored, and the operating parameters of the demodulator 104 are adjusted accordingly to ensure acceptable levels of performance. The operating parameters that are adjusted include both the clock rate of certain components of the demodulator 104 as well as their resolutions. For example, in a relatively noisy environment or where the received signal strength is weak, the analog to digital converter (ADC) 230 is operated at a higher frequency and with more bits of resolution. In contrast, when the received signal is strong and relatively noiseless, acceptable performance may be obtained by reducing both the ADC 230 conversion frequency (i.e., sampling frequency) and resolution (i.e., number of bits per sample), and reducing other processing parameters such as the digital filter size (i.e., different stages of the filter may be turned on or off to save power) and the clock frequency within the digital demodulator 104.

Figure 3:
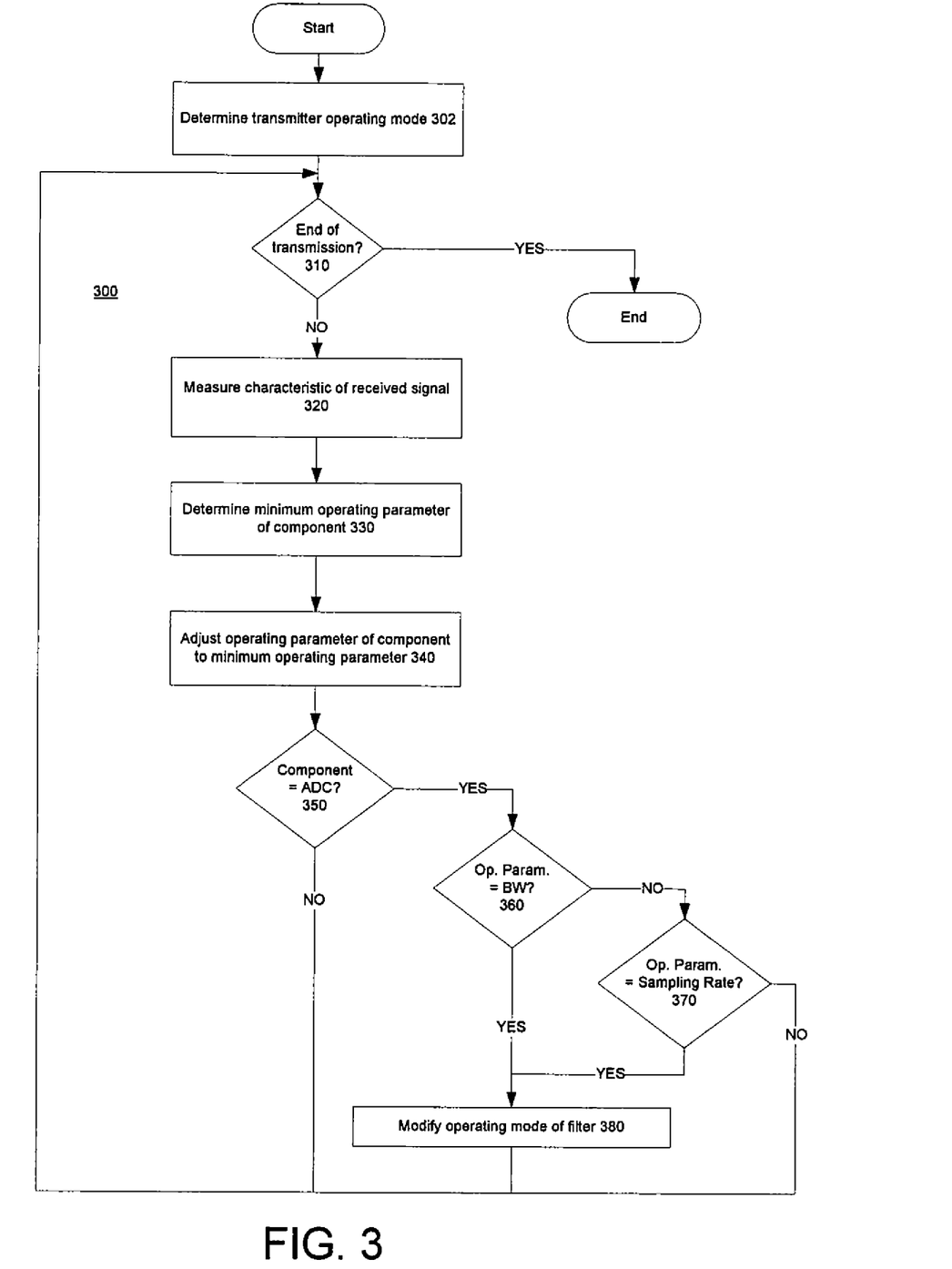
FIG. 3 is a flow chart illustrating the operation of the demodulator consistent with an implementation of the present invention.

The flow chart of FIG. 3 illustrates a process 300 performed by the demodulator 104 depicted in FIG. 2. Initially, the power management module 210 determines the operating mode of the transmitter (step 302). If the transmitter is not at the end of a transmission (step 310), the power management module 210 also measures a characteristic of the received signal (step 320). The power management module 210 uses the transmitter operating mode and the measured characteristic to determine the minimum operating parameter of the component (step 330). The power management module 210 then adjusts the operating parameter of the component to the minimum operating parameter (step 340).

The channel parameters estimation and smart power management module 210 monitors the ADC 230, the dynamic multi-rate filter 240, the mode adaptive OFDM engine 250, the bit-rate adaptive FEC decoder 260, and the bit-rate adaptive MPE-FEC processor 270 and determines the optimum parameters that minimize power and, at the same time, do not degrade overall receiver performance so that a user does not detect a difference in the received signal. The ADCs 230 may be dynamically adjusted to have a sampling rate of 1×, 2×, 3×, 4×, and 6× the fundamental fast Fourier transform (FFT) sampling rate, which are called for by the DVB-H standard. The ADCs 230 may be dynamically adjusted to have bit-widths of 6, 10, or 12 bits. The multi-rate filter 240 may be dynamically adjusted to the bit-width and sampling rate of the ADCs 230. The operating clock frequency of the OFDM Engine 250 may be statically adjusted depending on the modulation mode. The operating clock frequency of the FEC decoder 260 may be statically adjusted depending on the effective bit rate of the current modulation mode and the code rate. Using a hardware look-up table, one may look up the effective bit rate and set the clock frequency of the FEC decoder according to that bit rate requirement so that the FEC decoder 260 may sustain the bit rate and minimize power consumption. The operating frequency of the MPE-FEC processor 270 may be statically/dynamically adjusted depending on the effective bit rate received and the type of program/ programs (e.g., audio or video applications) received. The power management module 210 continuously monitors the channel conditions and dynamically/statically adjusts the ADCs 230, the dynamic multi-rate filters 240, the mode adaptive OFDM engine 250, the bit-rate adaptive FEC decoder 260, and the bit-rate adaptive MPE-FEC processor 270 to achieve optimum power consumption. Thus, for example, the ADC 230 may be adjusted so that its bit error rate is below the threshold resulting observable visual artifacts. For an RF chip that provides a power saving mode based on SNR and operating point, the processor will set the power saving modes of the RF chip.

When designing the ADCs 230 for digital demodulation, among the major considerations facing a design engineer are the sampling rate and the bit-width. In a conventional wireless communication device, the sampling rate and bit-width of the ADCs 230 are set based on the worst case channel conditions and modulation requirements. For example, the DVB-T/H operating frequency channels may range between approximately 100 MHz to 1.6 GHz and the channel bandwidth may be 5, 6, 7, or 8 MHz. The adjacent channel interference/co-channel interference of each frequency channel is different. The worst case adjacent channel interference may be 45 dB above the channel of interest. To accommodate the additional interference signal would require approximately 7 additional bits. Furthermore, the bit-width requirement for QPSK modulation is different from the bit-width requirement for 64-QAM. To accommodate the worst case adjacent channel interference, 64-QAM demodulation would require 12 bits and a sampling rate of 4 times the fundamental FFT sampling rate.

Using methods and systems consistent with the present invention, however, if no adjacent channel interference is present and QPSK demodulation is the only mode required, a 6-bit, 1 times or 2 times the FFT sampling rate would be adequate. The difference in power consumption between these two extremes (i.e., the conventional, worst case settings and the more optimal settings provided in accordance with the present invention) may be as high as a factor of 30. Methods and systems consistent with the present invention continuously monitor the channel conditions including adjacent channel interference, co-channel interference, signal to noise ratio (SNR), bit error rate (BER), packet error rate (PER), and effective bit transmission rate. This information, together with the modulation mode (QPSK, 16-QAM, or 64-QAM in the case of the DVB standards) is used to dynamically adjust the sampling rate/bit-width of the ADCs 230 to permit optimum power consumption without sacrificing performance.

Figure 4:
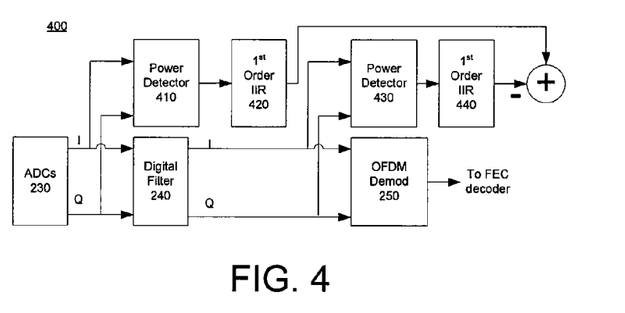
FIG. 4 depicts a circuit in a digital demodulator which measures the received signal strength indicator (RSSI) before and after the digital filter according to an embodiment of the present invention.

The adjacent channel interference may be measured using power detectors situated before and after the digital filters in the receive chain. FIG. 4 depicts one embodiment of a circuit 400 that measures the received signal strength indicator (RSSI) before and after the digital filter 240. As shown, the I and Q outputs from the ADC 230 are provided to a first power detector 410, the output of which is provided to a first order infinite impulse response (IIR) filter 420. The I and Q outputs from the filter 240 are likewise provided as inputs to a second power detector 430 and first order IIR filter 440. The difference between the measurement from IIR filter 420 and IIR filter 440 is directly proportional to the amount of adjacent channel interference.

Figure 5:
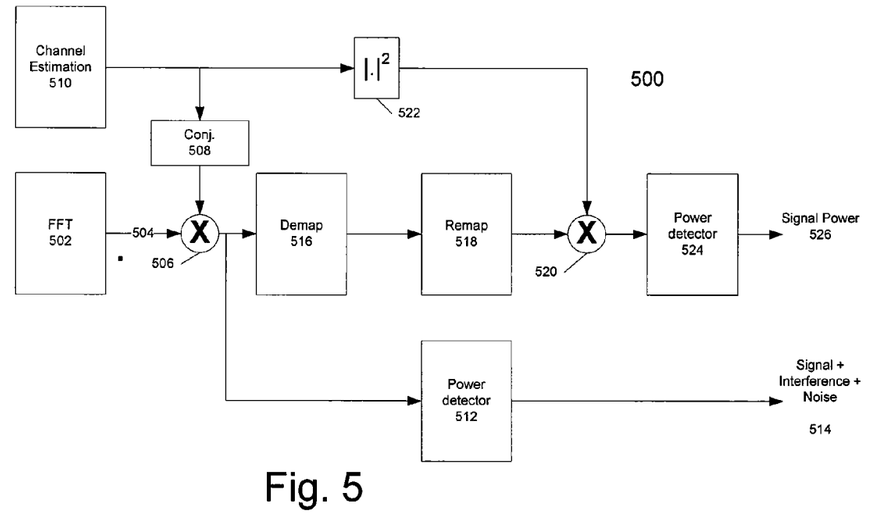
FIG. 5 depicts a block diagram of a circuit for measuring the Signal to Interference+Noise Ratio (SINR) for Orthogonal Frequency Division Multiplexing (OFDM) demodulation according to an embodiment of the present invention.

The co-channel interference and SNR may be measured using a Signal to Interference+Noise Ratio (SINR) estimator. FIG. 5 shows a circuit 500 configured to measures the SINR for Orthogonal Frequency Division Multiplexing (OFDM) demodulation. As shown, the carrier output 504 from the FFT 502 is equalized with its channel estimate by performing a complex multiplication 506 of the FFT with the complex conjugate 508 of the channel estimate 510 for that carrier. This equalized carrier is power detected 512 to yield the signal+interference+noise power 514. This equalized output is also demapped 516 and then remapped 518 into the received signal constellation point for the specified modulation mode. This received constellation point is then multiplied 520 with the square magnitude 522 of the channel estimate for that carrier and power detected 524 to yield the signal power 526. The interference+noise power is the difference between the signal+interference+noise power and the signal power. The SINR estimate can then be derived by taking the ratio of the signal power to the interference+noise power.

The bit error rate (BER) after the Viterbi decoding (e.g., FEC decoder 260) may be estimated using the path metric spread within the Viterbi decoding algorithm. The metric spread is the difference between maximum (worst) metric and the minimum (best) metric. Simulations have shown that the metric spread correlates well with BER.

The packet error rate (PER) after the Reed-Solomon decoder (i.e., MPE-FEC processor 270) may be measured with a counter that increments every time the Reed-Solomon decoder identifies a packet that has an error that it cannot correct.

Returning to the flow chart of FIG. 3, after adjusting the operating parameter of the component to the minimum operating parameter in step 340, if the demodulator component is an ADC 230 (step 350) and if the operating parameter is the bit-width (step 360), then the power management module 210 modifies the operating mode of the dynamic multi-rate filter 240 (step 380). Also, if the demodulator component is an ADC 230 (step 350) and if the operating parameter is the sampling rate (step 370), then the power management module 210 modifies the operating mode of the dynamic multi-rate filter 240 (step 380). Thus, whenever the bit-width or the sampling rate of the ADCs change, the power management module 210 changes the subsequent decimation filter's operating mode to accommodate the changes to the ADC. The power consumption of the multi-stage decimation filters thus also benefit from that change.

If the component is not an ADC 230 (step 350), or if the operating parameter is not the bit-width (step 360) and if the operating parameter is not the sampling rate (step 370), then the demodulator 104 returns to step 310 and continues this process until the end of the transmission.

One challenge of dynamically changing the bit-width and sampling rate in accordance with the above-described process is to make the transition "seamlessly," i.e., without disturbing the phase track and time track of the demodulation. There are two possible schemes to address the DVB-H case. One is to make the change only on a time slice boundary. This scheme eliminates the challenge of designing the circuit to accommodate the transient of dynamically changing the bit-width and sampling rate at the price of lower time resolution for the dynamic power management. The optimum power saving scheme is to dynamically change the bit-width and sampling rate from OFDM symbol to OFDM symbol. This scheme, however, requires additional circuits in the ADCs, decimation filters, and phase/time track to smooth out the transient. The ideal switching point would be the guard interval (GI) of the OFDM symbol which gives the circuit time for the transient to settle down before the useful portion of the OFDM symbol. To accomplish "seamless" sampling rate switching, the change in timing and change in phase between different sampling rates should be deterministic and known in advance.

Figure 6:
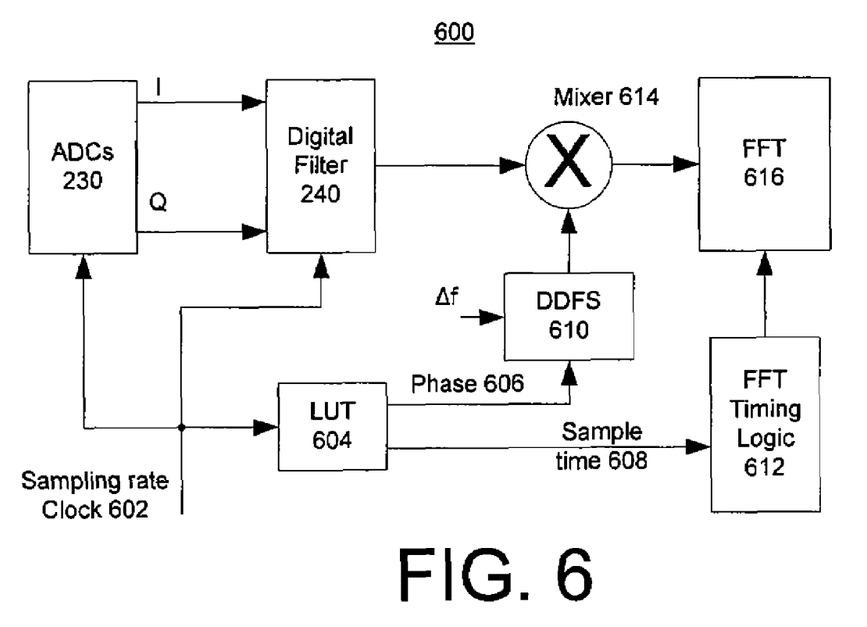
FIG. 6 depicts a block diagram of a circuit for dynamically adjusting the sampling rate at the guard interval for a received symbol according to an embodiment of the present invention.

For each ADC sampling rate, we design a deterministic filter chain so that the delay and phase change through the filter chains are known. The delay and phase change information are stored in hardware in the form of a look up table (LUT). When the sampling rate is dynamically switched, the delay information is used to determine the next sample used to start the FFT, and the phase change information is used to update the phase track circuit to smooth out the transition. FIG. 6 shows a block diagram of an exemplary circuit 600 for implementing this approach.

As shown, the ADCs 230 provide I and Q outputs to the multi-rate digital filter 240. Each of these components is provided with a clock signal 602 operating at the sampling rate. The same sampling rate clock is provided as an input to the LUT 604, the outputs of which are phase information 606 and sample time information 608. The phase information is provided to direct digital frequency synthesizer (DDFS) 610 and the sample time information is provided to FFT timing logic 612. The DDFS 610 generates the frequency offset to remove any carrier frequency error using the mixer 614 by performing a complex multiplication of the output of the digital filter 240 with the complex conjugate of the DDFS 610 output. The FFT timing logic 612 adjusts the FFT window based on the sample time adjustment 608 and starts the FFT engine 616.

The DVB-T/H standards provide significant flexibility for carriers to deploy systems based on a number of trade-offs: cell site coverage, band-width efficiency, multi-path immunity, equipment cost (primarily on the receiver side), and quality of service. As a result of these flexibilities, the bit-rate and processing requirements for the demodulator are different from service provider to service provider. According to methods and systems consistent with the present invention, to be DVB-T/H compliant, the demodulator must accommodate all of these different bit-rates and modes of operation.

Rather than having a demodulator architecture running at the worst case clock frequency which may accommodate 2K, 4K, 8K, in-depth and native de-interleaver, and useful bit rates from approximately 3 Mbps to approximately 32 Mbps, the clock frequency is set for each functional block of the demodulator based on the transmission parameter set (TPS) information, which allows the receiver to demodulate correctly. The TPS includes 2K, 4K, 8K mode, QPSK, 16-QAM, 64-QAM, hierarchy modulation, in-depth VS native de-interleaving and convolution code rate. After the demodulator has acquired the channel (time sync, frequency sync, frame sync) and demodulated the TPS information, the clock frequency for the OFDM Engine is set based on the FFT mode (2K, 4K, 8K) and in-depth VS native de-interleaving. The forward error correcting (FEC) block operating clock frequency is set based on the modulation mode (QPSK, 16-QAM, 64-QAM, hierarchy or non-hierarchy) and convolutional code rate. The MPE-FEC processor and the application layer processor clock rate are set based on modulation mode, convolution code rate, and the program/programs received.

As an alternative embodiment, rather than dynamically adjusting the bit-width and sampling rate of ADCs, the demodulator could be configured to statically set the bit-width and sampling rate of ADCs based on the modulation mode (QPSK, 16-QAM, 64-QAM, hierarchy or non-hierarchy), convolution code rate, and MPE-FEC parity bytes. Such an implementation would benefit from reduced complexity as compared to the power management implementation described above, but would be sub-optimum from the point of view of minimizing power consumption.

As another alternative, rather than statically changing the clock frequency of the OFDM engine, FEC decoder, and MPE-FEC processor, the demodulator could be configured to operate at the worst case clock frequency and process the samples as fast as possible, and then power down (by clock gating) for the remaining period of the OFDM symbol.

Although the present invention has been described primarily with respect to the DVB standard which includes both DVB-H and DVB-T standards, it will be appreciated that the invention has wide applicability to other types of circuits in which digital processing requirements vary according to both static parameters such as the modulation/demodulation scheme being used, and dynamic parameters such as SNR and error rates. Additionally, in some applications the output resolution and error rate requirements could change according to an operating mode or on demand. More broadly, the method of varying the ADC or digital to analog conversion (DAC) rates and bit-widths, and the method of varying size and speed of functional blocks such as FFT computation blocks, dynamically according to the dynamic operating conditions of the circuit and its environment, could be widely applied to circuits and systems other than digital demodulators.

The foregoing description of an implementation of the invention has been presented for purposes of illustration and description. It is not exhaustive and does not limit the invention to the precise form disclosed. Modifications and variations are possible in light of the above teachings or may be acquired from practicing the invention. For example, the described implementation includes software but the present implementation may be implemented as a combination of hardware and software or hardware alone. Further, the illustrative processing steps performed by the program may be executed in an different order than described above, and additional processing steps may be incorporated. The invention may be implemented with both object-oriented and non-object-oriented programming systems. The scope of the invention is defined by the claims and their equivalents.

What is claimed is:

1. A method for managing power in a receiver that receives a signal from a transmitter, comprising the steps of:
   determining whether the transmitter has completed transmission of a previous signal;
   determining minimum acceptable values of one or more operating parameters of one or more of a plurality of components of a demodulator of the receiver according to an operating mode of the transmitter as determined by the demodulator and a characteristic of a received signal from the transmitter; and
   adjusting one or more of the operating parameter of the one or more components to the minimum acceptable values of the operating parameters, the adjustment made on a time slice boundary between the received signal and the previous signal;
   wherein the one or more operating parameters is at least one of a clock rate and a bit width.

2. The method according to claim 1, wherein the one or more components comprise a multi-rate filter, an OFDM engine, a forward error correcting (FEC) decoder, and a multi-protocol encapsulation-forward error correction (MPE-FEC) processor.

3. The method according to claim 1, wherein the operating mode comprises one of 2K/4K/8K mode, QPSK, 16-QAM, 64-QAM, hierarchy modulation, in-depth VS native de-interleaving, and convolution code rate.

4. The method according to claim 1, wherein the characteristic of the received signal comprises one of a signal-to-noise ratio, an error rate, an interference level, and an effective bit transmission rate.

5. The method according to claim 4, wherein the error rate comprises one of a bit error rate and a packet error rate.

6. The method according to claim 4, wherein the interference comprises one of an adjacent channel interference and a co-channel interference.

7. The method according to claim 1, wherein the component comprises an analog-to-digital converter.

8. The method according to claim 7, wherein the operating parameter further comprises a sampling rate.

9. The method according to claim 8, further comprising the step of modifying an operating mode of a multi-rate filter in response to adjusting the operating parameter.

10. A method for managing power in a receiver that receives a signal from a transmitter, wherein the receiver includes a demodulator comprising a plurality of components, the method comprising the steps of:
    determining whether the transmitter has completed transmission of a previous signal;
    determining an operating mode of the transmitter based on a received signal;
    determining a minimum operating parameter of one of the plurality of components, wherein the minimum operating parameter is based on the operating mode; and
    adjusting an operating parameter of the component to the minimum operating parameter, the adjustment made on a time slice boundary between the received signal and the previous signal;
    wherein the one or more operating parameters is at least one of a clock rate and a bit width.

11. The method according to claim 10, wherein the component comprises one of a multi-rate filter, an OFDM engine, a forward error correcting (FEC) decoder, and a multi-protocol encapsulation-forward error correction (MPE-FEC) processor.

12. The method according to claim 10, wherein the operating mode comprises one of 2K/4K/8K mode, QPSK, 16-QAM, 64-QAM, hierarchy modulation, in-depth VS native de-interleaving, and convolutional code rate.

13. The method according to claim 10, wherein the component comprises an analog-to-digital converter.

14. The method according to claim 13, wherein the operating parameter further comprises a sampling rate.

15. The method according to claim 14, further comprising the step of modifying an operating mode of a dynamic multi-rate filter in response to adjusting the operating parameter.

16. A method for managing power in a receiver that receives a signal from a transmitter, wherein the receiver includes a demodulator comprising a plurality of components, the method comprising the steps of:
    determining whether the transmitter has completed transmission of a previous signal;
    measuring a characteristic of a received signal;
    determining a minimum operating parameter of one of the plurality of components, wherein the minimum operating parameter is based on the characteristic; and
    adjusting an operating parameter of the component to the minimum operating parameter, the adjustment made on a time slice boundary between the received signal and the previous signal;
    wherein the minimum operating parameter is at least one of a clock rate and a bit width.

17. The method according to claim 16, wherein the component comprises one of a multi-rate filter, an OFDM engine, a forward error correcting (FEC) decoder, and a multi-protocol encapsulation-forward error correction (MPE-FEC) processor.

18. The method according to claim 16, wherein the characteristic comprises one of a signal-to-noise ratio, an error rate, an interference level, and an effective bit transmission rate.

19. The method according to claim 18, wherein the error rate comprises one of a bit error rate and a packet error rate.

20. The method according to claim 18, wherein the interference comprises one of an adjacent channel interference and a co-channel interference.

21. The method according to claim 16, wherein the component comprises an analog-to-digital converter.

22. The method according to claim 21, wherein the operating parameter further comprises a sampling rate.

23. The method according to claim 22, further comprising the step of modifying an operating mode of a dynamic multi-rate filter in response to adjusting the operating parameter.

* * * * *